2,219,359

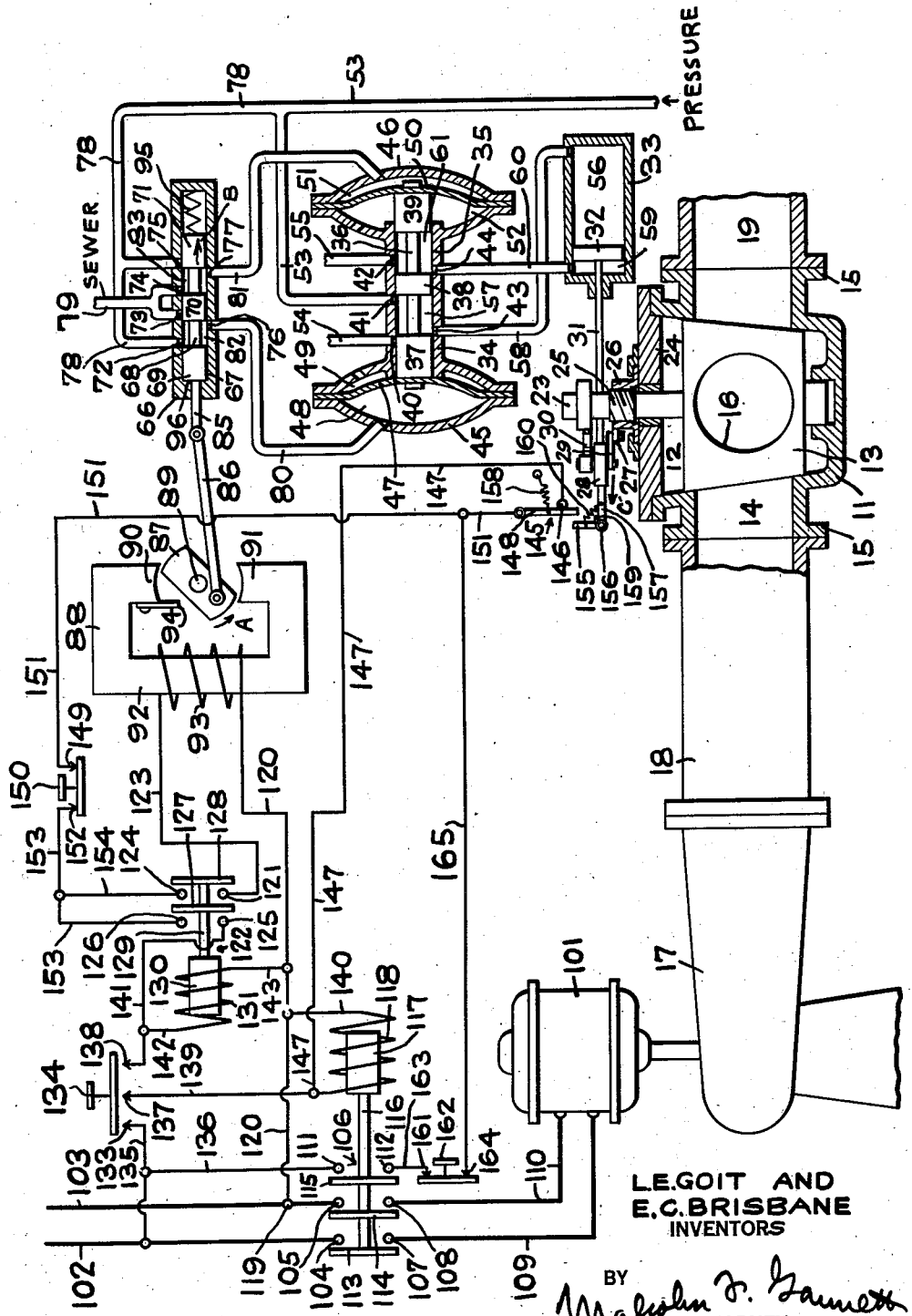
Oct. 29, 1940.  L. E. GOIT ET AL  2,219,359
CONTROL SYSTEM
Filed Nov. 18, 1939
L.E. GOIT AND
E.C. BRISBANE
INVENTORS
BY
Malcolm F. Gannett
ATTORNEY Patented Oct. 29, 1940

UNITED STATES PATENT OFFICE 2,219,359

CONTROL SYSTEM

Laurance E. Goit, Los Angeles, Calif., and Eugene C. Brisbane, York, Pa., assignors to S. Morgan Smith Company, York, Pa., a corporation of Pennsylvania Application November 18, 1939, Serial No. 305,126

10 Claims. (Cl. 103—40)

This invention relates to control systems, and more particularly to control systems adapted to control the operation of power operated tapered plug valves.

An object of the invention is to provide an improved control system for power operated mechanism of a valve installed in a pipe line on the pressure side of a motor driven pump, in which electromagnetically operated means are associated with the circuit supplying current to the pump motor so as to be responsive to line connections for said motor to control the operation of the valve mechanism.

Another object of the invention is to provide an improved electromagnetically actuated control mechanism for power operated valves, in which the electromagnet is responsive to a plurality of independently operable line connection means.

With the foregoing and other objects and advantages in view, the invention consists in the preferred construction and arrangement of the several parts which will be hereinafter fully described and claimed.

In the accompanying drawing, the single figure is a diagrammatic view, partly in section of a control system embodying the present invention.

Referring to the drawing, the improved control mechanism may be used in connection with a tapered plug valve of the type embodying a main body or casing 11, having a cavity 12 formed therein for a tapered plug 13, the cavity 12 being intersected by a waterway or opening 14 which constitutes a passage through the valve. The plug 13 has a passage 16 formed therein so that when the plug 13 is in open position a bore will extend through the valve from end to end. The portion of the valve casing 11 in which the waterway 14 is formed may terminate in flanges 15 by which the valve may be connected to the ends of pipes or conduits in well known manner. In the present instance, one end of the valve 11 is shown connected to the discharge end of a pump 17 by a suitable length of pipe 18 and the other end of the valve is connected to a pipe 19. The pump 17 is adapted to deliver water from a suitable source of supply to the pipe, and the valve 11 may be adapted to control communication through the pipe line from the pump so that when the pump is inactive communication through the pipe line is cut off by the valve, thereby preventing back flow of the water towards the pump.

The valve plug 13 is supported for both axial and rotary movement in the valve body 11, and at its upper or larger end, the plug 13 has fixed thereto a shaft 23 which extends through a cover plate 24 attached to the valve body 11.

The valve shaft 23 is formed with screw threads 25 on which is mounted a lift nut 26 having a lateral extension 27 connected to a reciprocable member 28 by a link 29.

Also connected to the member 28 is the end of a crank arm or rotating lever 30 which is keyed to, or otherwise made rigid with, the valve shaft 23.

When the member 28 is moved rectilinearly in the manner to be hereinafter described, the nut 26 is turned with respect to the shaft 23 thereby effecting axial movement of the valve plug 13 so as to unwedge said plug. Continued movement of the member 28, after the plug 13 has been unwedged, effects operation of the lever 30 whereby said plug is rotated towards open position. At the completion of the rotary movement of the plug 13, through the operation of the lever 30, the nut 26 is again turned on the shaft 23, but in a reverse direction, so as to move the plug 13 axially and wedge the same in the valve body 11.

The member 28 is connected to a rod 31 of a piston 32 mounted in a cylinder 33.

For the purpose of controlling the operation of the piston 32, a suitable relay valve device 34 is employed.

The relay valve 34 comprises a casing formed with a cylindrical bore 35 in which is mounted a piston valve 36 having a plurality of spaced heads 37, 38 and 39, which heads are adapted to control communication through a plurality of ports 40, 41, 42, 43 and 44, in the manner to be hereinafter described.

For the purpose of operating the piston valve 36, fluid pressure responsive devices consisting of two diaphragm devices 45 and 46 arranged at the opposite ends of the relay valve 34 are employed.

The diaphragm device 45 has a diaphragm 47 mounted in a casing between two chambers 48 and 49, said diaphragm being connected to the end of the piston valve 36 having the head 37.

The diaphragm device 46 has a diaphragm 50 mounted in a casing between two chambers 51 and 52, the diaphragm 50 being connected to the end of the piston valve 36 having the head 39.

The port 41 is connected to a source of fluid under pressure by a pipe 53, and the ports 40 and 42 are connected to a sewer or free discharge by pipes 54 and 55, respectively.

When the valve plug 13 is in closed position, as shown in the drawing, the piston valve 36 of the relay valve 34 will be so positioned that fluid under pressure will be supplied from the pressure supply pipe 53 to piston chamber 56, through port 41, valve chamber 57, port 43, and pipe 58, and piston chamber 59 will be connected to the sewer or free discharge, through pipe 60, port 44, valve chamber 61, port 42, and pipe 55.

For the purpose of controlling the operation of the relay valve device 34, a pilot valve device 66 is employed.

The pilot valve 66 comprises a casing formed with a cylindrical bore 67 in which is mounted a piston valve 68 having a plurality of spaced heads 69, 70 and 71, adapted to control communication through a plurality of ports 72, 73, 74, 75, 76 and 77 in the manner to be hereinafter described.

The ports 72 and 75 are connected to the fluid pressure supply pipe 53, by a pipe 78.

The ports 73 and 74 are connected to a sewer or free discharge, by a pipe 79.

The port 76 is connected to the diaphragm chamber 48, by a pipe 80, and the port 77 is connected to the diaphragm chamber 51, by a pipe 81.

The diaphragm chambers 49 and 52 are open to the atmosphere, as shown.

In valve plug closed position of the apparatus the pilot valve device 66 is positioned so that fluid under pressure is supplied from the pressure supply pipe 78, through port 72, valve chamber 82, port 76 and pipe 80, to the diaphragm chamber 48. At the same time the diaphragm chamber 51 is connected to the sewer or free discharge, through pipe 81, port 77, valve chamber 83, port 74, and pipe 79. In this way the piston valve 36 is maintained in the position illustrated by the fluid under pressure supplied to diaphragm chamber 48.

The piston valve 68 has a stem 85 which extends through the casing of the pilot valve 66 and is connected by a link 86 to the armature 87 of an electromagnet device 88.

The armature 87 is mounted on a shaft 89 for limited rotary movement with respect to the poles 90 and 91 of the electromagnet device 88. The electromagnet device has a yoke 92 provided with a coil 93 adapted to be supplied with current from a suitable source of supply in the manner to be hereinafter described.

Rotation of the armature 87 in the direction towards the poles 90 and 91 is limited by a stop 94 adapted to engage the armature when the armature has moved from the position illustrated in the drawing to the position in which the ends of the armature aline with the poles 90 and 91.

Mounted in the bore 67 of the pilot valve 66, and bearing at one end against the end of said bore and at the opposite end against the head 71 of the piston valve 68, is an expansible coil spring 95.

When the coil 93 is deenergized, the spring 95 is adapted to urge the piston valve 68 towards the stop provided by the end wall 96, in which position the armature 87 will be so disposed that the ends thereof are out of alinement with the poles 90 and 91.

When the coil 93 is energized the armature 87 is rotated on the shaft 89 and turned in the direction of the arrow A to the position in which said armature engages the stop 94. The rotation of the armature 87 shifts the piston valve 68 in the direction of the arrow B to the position in which the port 72 is lapped by piston head 69, port 74 is lapped by piston head 70, port 73 is connected to port 76, through valve chamber 82, and port 75 is connected to port 77 through valve chamber 83.

With the port 72 thus lapped and ports 73 and 76 connected, the diaphragm chamber 48 will be connected to the sewer pipe 79, and with port 74 lapped and ports 75 and 77 connected, fluid under pressure from pipe 78 will be supplied to the diaphragm chamber 51, through pipe 81. The piston valve 36 is then actuated in a direction towards the left as illustrated and the heads 37, 38 and 39 are shifted toward the left so that head 39 laps the port 42, port 41 is connected to port 44 through valve chamber 61, and port 40 is connected to port 43 through valve chamber 57.

The piston chamber 56 is thus connected to the sewer pipe 54, through pipe 58 and chamber 57, and the piston chamber 59 is connected to the fluid supply pipe 53, through chamber 61 and pipe 60. The piston 32 is then actuated to operate the valve plug mechanism and effect rotation of the plug 13 from closed to open position. The valve plug 13 will remain in open position as long as the coil 93 is energized.

The pump 17 may be operated by an electric motor 101 of any suitable type, said motor being adapted to be supplied with current from a suitable source of power supply, such as the lines 102 and 103, under the control of mechanism to be hereinafter more fully described.

The lines 102 and 103 are connected to the fixed contact points 104 and 105, respectively, of a main pump motor switch mechanism 106. Other fixed contact points 107 and 108 of this switch mechanism are connected to the terminals of the motor 101, by conductors 109 and 110, respectively.

The motor switch mechanism 106 also includes contact points 111 and 112, and contact bars 113, 114 and 115 carried by the operating shaft 116 of the plunger 117 of a relay 118, said contact bars being adapted to engage the pairs of contact points 104, 107 and 105, 108 and 111, 112, respectively, when the solenoid coil of the relay 118 is energized in the manner to be hereinafter more fully described.

One end of the coil 93 of the electromagnet device 88 is connected to the line 103, at the point 119, by a conductor 120.

The other end of the coil 93 is connected to the contact point 121 of an auxiliary switch mechanism 122, by a conductor 123.

The auxiliary switch mechanism 122 also includes contact points 124, 125 and 126, and contact bars 127 and 128 carried by the operating shaft 129 of the plunger 130 of a relay 131, said contact bars being adapted to engage the pairs of contact points 121, 124 and 125, 126, respectively, when the solenoid coil of the relay 131 is energized.

Leading from the line 102 and connected to the contact point 133 of a push button switch device 134, is a conductor 135.

The contact point 111 of the pump motor switch mechanism 106 is connected to the conductor 135, by a conductor 136.

The push button switch device 134 is of the three point type, and in addition to the contact point 133, it has two other contact points 137 and 138.

The contact point 137 is connected to one end of the coil of the relay 118, by a conductor 139, the other end of said relay coil being connected to the conductor 120, by a conductor 140.

The contact point 138 is connected to the contact point 125 of the auxiliary switch mechanism 122, by a conductor 141.

Also associated with the control system is a tripping switch mechanism 145 which is adapted to be actuated by the operating mechanism of the valve 11.

The tripping switch mechanism 145 includes a fixed contact point 146 which is connected to the conductor 139, by a conductor 147, and a movable contact bar 148 which is electrically connected to a contact point 149, of a push button switch device 150, by a conductor 151.

The other contact point 152 of the switch device 150 is connected to the contact point 126 of the auxiliary switch mechanism 122, by a conductor 153. Contact point 124 is connected to the conductor 153 by a conductor 154.

The movable contact bar 148 of the tripping switch mechanism is adapted to be engaged by an arm 155, pivotally connected as indicated at 156, to an extension 157, of the reciprocable member 28, when said member is actuated in the direction of the arrow C.

Normally the contact bar 148 is retained in engagement with the contact point 146 by a spring 158.

Also, normally the arm 155 is retained in position against a stop lug 159, by a spring 160.

The construction and arrangement of the parts of the tripping switch mechanism is such that when the piston 32 moves from valve closed to valve open position, the arm 155, upon engaging the extended portion of the contact bar 148 in its path, swings downwardly and passes beneath said contact bar.

On the other hand, when the piston 32 moves from valve open towards valve closed position, at a point in the piston travel near the end of the movement of the piston towards valve closed position, the arm 155 engages the contact bar 148 and moves said bar away from the contact point 146. This results in the coil of the pump motor switch relay 118 being deenergized so that the main circuit of the pump motor 101 is opened, in the manner to be hereinafter described.

The contact point 112 of the pump motor switch mechanism 106 is connected to a contact point 161 of a push button switch device 162 by a conductor 163. The other contact point 164 of the switch 162 is connected to the conductor 151, by a conductor 165.

When the pump 17 is inactive, the valve plug 13 is in closed position, as shown, and the control circuit of the pump motor 101 is, as illustrated, with the contact bar of the push button switch 150 in engagement with the contact points 149 and 152, and the contact bar of the switch 162 in engagement with the contact points 161 and 164. Since the contact bar of the push button switch 134 is out of engagement with the contact points 133, 137 and 138, the circuit through which the relays 118 and 131 are energized will be open.

The switch 134 may be termed "the starter switch," since it is adapted to be actuated first when it is desired to start the pump 17.

The switch 150 is normally retained in closed position, as shown, and is adapted to be actuated when it is desired to shut down the apparatus and close the valve plug 13. This switch may be termed "the valve closing switch," or "the stop switch."

The switch 162 is normally retained in closed position, as shown. In an emergency, operation of switch 162 effects deenergization of the relays 118 and 131 and the electromagnet coil 93, so that the motor circuit is opened simultaneously with the movement of the valve plug 13 towards closed position.

When it is desired to start the pump 17, the push button switch device 134 is operated to close the circuits by which the relays 118 and 131 are energized.

When the contact bar of the switch 134 engages the contact points 133, 137 and 138, the relay 118 will be energized by current from the line 102, through conductors 135, 139, the coil of relay 118, and from thence through the conductors 140 and 120 to the line 102. At the same time, the relay 131 will be energized by current from the line 101, through conductors 135, 141 and 142, the coil of relay 131, and from thence through the conductors 143 and 120 to the line 103.

With the solenoid coil of the relay 118 thus energized, the plunger 117 will be pulled so that contact bar 113 connects contact points 104 and 107, contact bar 114 connects contact points 105 and 108, and contact bar 115 connects contact points 111 and 112.

The contact bars 113 and 114 close the circuit through the motor 101, from the line 102, through conductors 109 and 110, to the line 103, so that the motor 101 is energized and operates the pump 17 in well known manner.

When the solenoid coil of the relay 131 is energized, the plunger 130 will be pulled so that contact bar 127 connects contact points 125 and 126, and contact bar 128 connects contact points 121 and 124.

With the contact points 125 and 126 connected by the contact bar 127, a circuit will be closed from the line 102, through conductors 135, 136, contacts 111, 115 and 112, conductor 163, contact 161, contact bar of the switch 162, contact 164, conductors 165 and 151, contact 149, contact bar of switch 150, contact 152, conductor 153, contacts 126, 127 and 125, conductors 141 and 142, the solenoid coil of the relay 131, and from thence through conductors 143 and 120, to the line 103. In this way a holing circuit is provided for retaining the solenoid coil of the relay 118 energized when the push button switch 134 is released.

The other contact bar 128 of the auxiliary switch mechanism 122 closes the circuit for energizing the coil 93 of the electromagnet device 88. From the line 102 this circuit passes through conductors 135, 136, contacts 111, 115 and 112, conductor 163, contact 161, contact bar of the switch 162, contact 164, conductors 165 and 151, contact 149, contact bar of the switch 150, contact 152, conductors 153 and 154, contacts 124, 128 and 121, conductor 123, coil 93, and from thence through conductor 120 to the line 103.

When the coil 93 is thus energized the armature 87 will be rotated so as to operate the pilot valve device 66 in the manner hereinbefore described, with the result that the valve plug 13 is operated by the piston 32 and associated mechanism and rotated to open position.

In this way communication through the pipe line leading from the pump 17 will be established, and this communication will remain open until it is desired to shut down the apparatus.

When it is desired to shut down the pump 17, under ordinary conditions the push button switch 150 may be actuated, and this breaks the circuit of the relay 131.

With the relay 131 thus deenergized the plunger 130 will be moved, thereby disconnecting the contact bars 127 and 128 from their respective contact points, thereby opening the circuit of the coil 93.

When the coil 93 is thus deenergized, the armature 87 is returned to the position shown in the drawing, by the action of the spring 95 on the plunger 68 of the pilot valve device 66, as has been described, and the valve plug 13 is operated by the piston 32 and associated mechanism and returned to closed position.

During the initiation of the valve plug closing operation as above described, the solenoid coil of the relay 118 remains energized by current supplied from the line 102, through conductors 135, 136, contacts 111, 115 and 112, conductor 163, contact 161, contact bar of the switch 162, contact 164, conductors 165, 151, tripping switch contact bar 148, contact 146, conductor 147, to the coil of the relay 118, and from thence through conductors 140 and 120 to the line 103. Consequently, the pump motor 101 continues to operate during the operation of closing the valve plug 13.

However, since the member 28 of the valve operating mechanism moves in the direction of the arrow C during the movement of the valve plug 13 towards closed position, after the piston 32 has moved a predetermined distance and the valve plug 13 has, as the result of such piston movement, been closed a predetermined amount, the arm 155 engages the movable contact bar 148 of the tripping switch 145 and disconnects said contact bar from the contact point 146, thereby breaking the circuit through which the solenoid coil of the relay 118 is energized. In this way the relay 118 is deenergized.

With the relay 118 thus deenergized the plunger 117 will be moved, thereby disconnecting the contact bars 113, 114 and 115 from their respective contact points, thereby opening the circuit of the pump motor 101. The pump 17 will cease to operate just before the piston 32 has completed operation of the valve plug mechanism to move the valve plug 13 to fully closed position.

The construction of the tripping switch mechanism 145 is such that the contact bar 148 is only momentarily disconnected from the contact point 146, as has been described.

If, during operation of the pump 17, an emergency condition arises and it is desirable to shut down the pump and close the valve plug 13 in the quickest time possible, the emergency switch device 162 is operated. This operation simultaneously opens the circuits by which the electromagnet coil 93 is supplied with current from the lines 102 and 103 and the coils of the relays 118 and 131 are energized. Consequently all three of said coils will be deenergized at the same time. In this way the pump motor 101 will be shut down at the same time that the valve operating mechanism is actuated to move the plug 13 to closed position.

What we claim is:

1. In a control system, the combination with a pipe line, a pump for delivering fluid to said pipe, an electric motor for operating said pump, a valve for controlling communication through the pipe, mechanism for operating the valve, means for controlling the operation of said valve mechanism, an electromagnet device having a coil, a pair of opposed poles, and an armature rotatably mounted between said poles, means operatively connecting said armature with said valve mechanism control means, electromagnetically operated switch mechanism for connecting said motor to a source of supply, means to initially control the operation of said switch mechanism, electrical means responsive upon establishment of line connections of said motor for controlling the energization of said electromagnet coil, and means operable independently of said initially controlling switch for breaking the circuit of the electromagnet coil controlling means.

2. In a control system, the combination with a pipe line, a pump for delivering fluid to said pipe, an electric motor for operating said pump, a valve for controlling communication through the pipe, mechanism for operating the valve, means for controlling the operation of said valve mechanism, an electromagnet device having a coil, a pair of opposed poles, and an armature rotatably mounted between said poles, means operatively connecting said armature with said valve mechanism control means, electromagnetically operated switch mechanism for connecting said motor to a source of supply, a switch to control initial operation of said electromagnetically operated switch mechanism, an auxiliary relay mechanism responsive upon establishment of line connections of said motor for controlling the energization of said electromagnet coil and for also holding the motor switch mechanism in closed position, and a switch operable independently of said initially controlling switch for breaking the circuit of said auxiliary relay.

3. In a control system, the combination with a pipe line, a pump for delivering fluid to said pipe, an electric motor for operating said pump, a valve for controlling communication through the pipe line, mechanism for operating the valve and including a fluid pressure operated piston, means for controlling the operating fluid to said piston, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when the electromagnet coil is energized, electromagnetically operated switch mechanism for connecting said motor to a source of supply, a switch to control initial operation of said electromagnetically operated switch mechanism, an auxiliary relay mechanism responsive upon establishment of line connections of said motor for controlling the energization of said electromagnet coil and for also holding the motor switch mechanism in closed position, means operatively connecting said armature with said fluid pressure controlling means, and a switch operable independently of said initially controlling switch for breaking the circuit of said auxiliary relay.

4. In a control system, the combination with a pipe line, a pump for delivering fluid to said pipe line, a valve for controlling communication through the pipe line, mechanism for operating the valve and including a fluid pressure operated piston, a relay valve for controlling the operating fluid to said piston, a pilot valve for controlling the operation of said relay valve, an electric motor for operating said pump, a relay switch means for connecting said motor to a source of supply, switch means for controlling the operation of said relay switch, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when the electromagnet coil is energized, means operatively connecting said armature to said pilot valve, and an auxiliary relay mechanism responsive upon establishment of line connections of said motor for controlling the energization of said electromagnet coil.

5. In a control system, the combination with a pipe line, a pump for delivering fluid to said pipe line, a valve for controlling communication through the pipe line, mechanism for operating the valve, means for controlling the operation of said valve operating mechanism, an electric motor for operating said pump, a relay switch means for connecting said motor to a source of supply, switch means for controlling the operation of said relay switch, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when the electromagnet coil is energized, means operatively connecting said armature with said valve mechanism controlling means, and an auxiliary relay mechanism responsive upon establishment of line connections of said motor for controlling the energization of said electromagnet coil.

6. The combination with a pipe line and a pump for delivering fluid thereto, of a valve for controlling communication through said pipe, mechanism for actuating said valve, a motor for operating said pump, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when the electromagnet coil is energized, means operatively connecting said armature with said valve mechanism, switch mechanism for connecting said motor to a source of supply and for simultaneously effecting energization of said electromagnet coil to effect operation of said valve mechanism to open the valve, and switch means operable independently of said switch mechanism for first disconnecting the line connections of said electromagnet coil to initiate operation of said valve mechanism to close the valve a predetermined amount before the line connections of said motor to the source of supply are disconnected.

7. In a control system, the combination with a pipe line, a pump for delivering fluid to said pipe, an electric motor for operating said pump, a valve for controlling communication through the pipe, mechanism for operating the valve and including a fluid pressure operated piston, a relay valve for controlling the operating fluid to said piston, a pilot valve for controlling the operation of said relay valve, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when said coil is energized, means operatively connecting said armature with said pilot valve, electromagnetically operated switch mechanism for connecting said motor to a source of supply, a switch to control initial operation of said switch mechanism to start said motor, an auxiliary relay mechanism responsive upon establishment of line connections of said motor for controlling the energization of said electromagnet coil to thereby effect operation of said valve mechanism to open the valve when the pump is started, switch means operable to disconnect the line connections of said auxiliary relay mechanism and thereby deenergize said electromagnet coil so as to initiate operation of said valve mechanism to close the valve while the pump is operating, and switch means operable by the valve mechanism and operated when said valve mechanism has moved the valve towards closed position a predetermined amount to deenergize said electromagnetically operated motor switch mechanism to thereby break the line connections of said motor to the source of supply.

8. The combination with a pipe line and a pump for delivering fluid thereto, of a valve for controlling communication through said pipe, mechanism for actuating said valve, a motor for operating said pump, electromagnetic means operatively connected to said valve mechanism for controlling the operation thereof, switch mechanism for connecting said motor to a source of supply and for effecting simultaneously therewith energization of said electromagnetic means so as to effect operation of said valve mechanism to open the valve when the pump is started, switch means operable independently of said switch mechanism for disconnecting the line connections of said electromagnetic means so as to initiate operation of said valve mechanism to close the valve, and switch means operable by the valve mechanism and operated when said valve mechanism has moved the valve towards closed position a predetermined amount to break the line connections of said motor to the source of supply.

9. In a control system, the combination with a pipe line, a pump for delivering fluid to said pipe, an electric motor for operating said pump, a valve for controlling communication through the pipe, mechanism for operating the valve and including a fluid pressure operated piston, means for controlling the operating fluid to said piston, an electromagnet device having a coil, a pair of opposed poles, and an armature rotatably mounted between said poles, said armature having a limited angle of rotation from a position out of alinement with said poles when the electromagnet coil is deenergized to a position in alinement with the poles when the electromagnet coil is energized, means operatively connecting said armature with said fluid pressure controlling means, switch mechanism for connecting said motor to a source of supply and for effecting simultaneously therewith energization of said electromagnet coil so as to effect operation of said valve mechanism to open the valve when the pump is started, switch means operable to disconnect the line connections of said electromagnet coil so as to initiate operation of said valve mechanism to close the valve while the pump is operating, and switch means operable by the valve mechanism and operated when said valve mechanism has moved the valve towards closed position a predetermined amount to break the line connections of said motor to the source of supply.

10. The combination with a pipe line and a pump for delivering fluid thereto, of a valve for controlling communication through said pipe, mechanism for actuating said valve, a motor for operating said pump, electromagnetic means operatively connected to said valve mechanism for controlling the operation thereof, switch mechanism for connecting said motor to a source of supply and for effecting energization of said electromagnetic means to effect operation of said valve mechanism to open the valve when the pump is started, and switch means operable independently of said switch mechanism for first disconnecting the line connections of said electromagnetic means so as to initiate operation of said valve mechanism to close the valve a predetermined amount before the line connections of said motor to the source of supply are disconnected.

LAURANCE E. GOIT.
EUGENE C. BRISBANE.